Patented Feb. 19, 1952

2,586,694

UNITED STATES PATENT OFFICE 2,586,694

CATALYTIC DEHYDROGENATION OF ALCO-
HOLS TO CARBONYL COMPOUNDS

Henry O. Mottern, Bloomfield, N. J., assignor to
Standard Oil Development Company, a corporation of Delaware No Drawing. Application August 23, 1948,
Serial No. 45,798

8 Claims. (Cl. 260—596)

This invention relates to an improved catalyst and, more particularly to an improved catalyst useful in the dehydrogenation of alcohols.

It is well known that the dehydrogenation of secondary alcohols to the corresponding ketones may be achieved by passing the alcohols at elevated temperatures over substances acting as dehydrogenation catalysts. In the early stages of development in this field, metals such as copper, brass, etc., were employed in this type of reaction. These catalysts possess the disadvantages of high operating temperatures and short life. Somewhat later, difficulty reducible metallic oxides such as zinc oxide, cerium oxide, magnesium oxide, etc., attained considerable prominence as dehydrogenation catalysts. Various combinations of catalytic metals and difficultly reducible metallic oxides have also been employed from time to time. It was found that difficultly reducible metallic oxides have a dehydrating as well as dehydrogenating effect and that due to the dehydrating effect, considerable olefin was regenerated from the alcohol which reduced the overall yield of ketone. In an attempt to minimize these reactions, additives such as the alkali or alkaline earth metal carbonates or hydroxides have been employed in conjunction with the difficultly reducible oxide catalysts. In instances where these additives have been used it has been noted that they make the catalyst thermally less stable, thus reducing its life and increase the susceptibility of the catalyst to catalyst poisons.

The object of the present invention is to increase the activity of difficultly reducible metallic oxide catalysts such as magnesium oxide, zinc oxide, and beryllium oxide as dehydrogenation catalysts particularly for the dehydrogenation of compounds containing secondary alcohol groupings.

Another object is to improve the stability of difficultly reducible metallic oxide catalysts at high temperatures. Still another object is to make these catalysts more resistant to poisons, thus lengthening their active life.

Another object of this invention is to provide a process for the dehydrogenation of alcohols wherein the by-products are relatively clean, that is, free of ethers hydrocarbons, resins, etc. These and other objects will be apparent to those skilled in the art from the following description.

These objects are accomplished by the following which, in its general aspect, comprises the preparation of a catalyst consisting of a major portion of an oxide of magnesium, zinc and beryllium, and a minor portion of an oxide of zirconium, cerium and thorium. The latter oxides are present in amounts ranging from 1 to 15 weight per cent, preferably 6 to 12 weight per cent, based on the total weight of the combined oxides. It has been found that from 1 to 15 per cent by weight of at least one of the oxides of zirconium, cerium and thorium, based upon the total weight of the catalyst composition, greatly improves the action of the magnesium oxide, zinc oxide, or beryllium oxide as a dehydrogenation catalyst. The catalyst is particularly effective in the dehydrogenation of compounds having the formula:

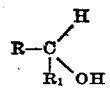

where R may be an alkyl, aryl, alkaryl, aralkyl or cyclo alkyl radical and $R_1$ can be H, or an alkyl, aryl, aralkyl, alkaryl or cycloalkyl radical such as methyl, ethyl, propyl, etc.; phenyl; benzyl, etc.; methyl phenyl or cyclohexyl.

The improvement obtained by using less than 1% of zirconium oxide, cerium oxide, or thorium oxide, or mixtures thereof, is perceptible but not sufficient to be of any consequence, while the improvement obtained by using more than 15% of these oxides is not sufficient over that obtained when using about 6 to 12% to warrant the additional expenditure.

It also has been found that catalysts of the type described can be further stabilized by the addition thereto of approximately 6 to 10% based on the weight of the zirconium oxide, cerium oxide, or thorium oxide, of a stabilizer selected from the group consisting of ferric oxide, silica, and alumina.

The catalyst prepared from ZnO, MgO or BeO and one of the three oxides of zirconium, cerium or thorium shows a high activity for dehydrogenation of pure secondary and low molecular weight primary alcohols. Pure feeds to a dehydrogenation process are not the general rule and in order to overcome the deleterious effect of impurities in the alcohol which resinify or carbonize under the conditions of dehydrogenation other metallic oxides have been added to the promoted zinc oxide catalyst. The catalyst prepared from the two oxides is inactivated by carbon or resin deposition unless a small amount of $SiO_2$, $Al_2O_3$ or $Fe_2O_3$ is also included. Primary alcohols above $C_6$ and polymeric olefins promote catalyst inactivation when present as impurities in the alcohol to be dehydrogenated.

PREPARATION OF CATALYST

The preparation of the catalyst of this invention may be exemplified by the preparation of a zinc oxide-zirconium oxide catalyst.

There are various types of zirconia which may be employed in the preparation of the zirconia containing catalysts of this invention. Typical analyses of some of the grades of zirconia suitable are as follows:

|  | Tamopax [1] | C. P. Grade | Electrically Fused | Spectroscopic Reference Sample |
| --- | --- | --- | --- | --- |
| Percent $ZrO_2$ | 87.97 | 99.37 | 97.10 | 99.943 |
| Percent $SiO_2$ | 8.49 | 0.30 | 1.88 | 0.020 |
| Percent $Al_2O_3$ | 0.38 | 0.08 | 0.52 | 0.005 |
| Percent $MgO$ | 0.30 | 0.05 | 0.05 | 0.005 |
| Percent $Na_2O$ (as silicate) | 1.50 | 0.02 | 0.02 | 0.002 |
| Percent $TiO_2$ | 0.30 | 0.15 | 0.30 | 0.005 |
| Percent $Fe_2O_3$ | 0.08 | 0.03 | 0.11 | 0.020 |

[1] A grade of zirconia manufactured by the Titanium Alloy Manufacturing Company, Niagara Falls, N. Y.

It has been established, however, that the catalytic effect of the zirconia added to the oxides of zinc, magnesium or beryllium, is due to the zirconium oxide itself, and not to the impurities contained therein. This was demonstrated by an experiment employing pure zirconium oxide as the additive to ZnO. In the preparation of the catalyst, it is preferred to mix the two oxides in the proper proportions in powdered form, then to work enough water into the mixture to make a heavy slurry of about the consistency of heavy cream. This will ordinarily require a volume of water approximately equal to the volume of powder employed. The catalyst slurry is then coated on a carrier. The coating may be accomplished by placing the catalyst support or carrier in a tumbling device, pouring the catalyst slurry over the carrier, and then tumbling until a uniform thick mix is secured. The mix is then placed in an oven at a temperature of about 80° C. and dried. The drying requires approximately 24 to 48 hours. Metal turnings may be employed as the catalyst carrier or support, although pumice in granular or pill form may be used as well as other types of carriers which are well known in the catalyst art. Pumice and metal turnings are preferred carriers, however, and of the metal turnings, steel or brass turnings are preferred.

CATALYTIC DEHYDROGENATION

The catalyst of the present invention is particularly suitable in the dehydrogenation of secondary alcohols such as isopropyl alcohol, secondary butyl alcohol, secondary amyl alcohol etc., to the corresponding ketones. The conversion of secondary alcohols to ketones is accomplished by passing the alcohol in vapor form through a catalyst packed tube heated to a temperature of about 400 to 1000° F., preferably 600 to 900° F., at a pressure of from 1 to 2 atmospheres, and a feed rate of from 0.5 to 10 volumes, preferably 1.5 to 3 volumes, of liquid alcohol per volume of catalyst per hour. The pressure preferably employed during the reaction is held between atmospheric pressure and about 10 psig. Higher pressures are not desirable because decomposition seems to be more noticeable when the reaction occurs at the higher temperatures. The product vapors are passed to a condenser where the ketone and unreacted alcohol are condensed from the less readily condensible gas consisting predominantly of hydrogen and a small amount of olefin hydrocarbon.

The alcohols employed in the dehydrogenation process may contain up to 10 to 12% of water without seriously affecting the dehydrogenation to the ketone. The principal by-product resulting from the dehydrogenation of secondary alcohols, according to this invention, has been found to be a high molecular weight ketone of rather high purity. Thus, the by-product conglomerate usually recovered from the dehydrogenation of secondary alcohols is made well defined and easily recoverable by the use of the catalyst described. The formation of other by-products such as ethers, hydrocarbons, and hydrocarbon polymer resins, etc., is practically eliminated. The principal by-product resulting from the dehydrogenation of isopropanol to acetone has been identified as mesityl oxide, and that from the conversion of secondary butanol to methyl ethyl ketone as a $C_8$ ketone in which 3-methyl heptene-3-one-5 predominates. Small amounts of methyl heptanone-3 and ethyl hexanone-2 have been identified in the latter by-product.

The following examples which are included merely for purposes of illustration and not as a limitation, serve to demonstrate the effectiveness of the catalyst described for the dehydrogenation of secondary alcohols under the conditions indicated. The examples demonstrate the effectiveness of the catalyst with respect to activity at high throughput, thermal stability, optimum temperature of reaction, long catalyst life, and resistance to poisons.

CATALYST ACTIVITY

The following table summarizes experiments showing the effectiveness of zinc oxide-zirconium oxide, zinc oxide-cerium oxide, and zinc oxide-thorium oxide catalysts in the dehydrogenation of alcohols: (In the following tables, "MEK" stands for "methyl ethyl ketone," "EAK" for "ethyl pentenyl ketone," "$C_3=$" for "propylene," and "$Bu=$" for "butylenes."

Table I

[DEHYDROGENATION OF ISOPROPANOL (91-99%) OVER 94 WEIGHT PER CENT ZnO:6 WEIGHT PER CENT ZrO₂ (C. P. GRADE)]

| Run No. | v./v./hr. | Temp. °F. | Per Cent Conversion | Per Cent Conversion to— | | | Acetone Yield |
|---|---|---|---|---|---|---|---|
| | | | | Acetone | Mesityl Oxide | Olefin | |
| 34 | 1.5 | 750 | 98.2 | 88.6 | 7.84 | 1.78 | 90.2 |
| 37 | 1.5 | 900 | 95.8 | 84.6 | 6.95 | 4.21 | 88.5 |
| 40 | 3.0 | 900 | 99.8 | 91.2 | 6.46 | 2.16 | 91.2 |
| 39 | 6.0 | 750 | 86.3 | 83.6 | 2.22 | .52 | 96.9 |
| 41 | 1.5 | | 92.3 | 82.4 | 7.88 | 1.99 | 89.3 |
| 31 | 1.5 | 750 | 95.4 | 85.6 | 9.14 | .69 | 89.7 |
| 35 | 1.5 | 900 | 99.4 | 88.3 | 8.49 | 2.62 | 88.8 |

Runs 31, 34 and 35 on 91% isopropanol; others on 99% isopropanol.

[DEHYDROGENATION OF 99% SEC. BuOH OVER 94 WEIGHT PERCENT ZnO₂:6 WEIGHT PER CENT ZrO₂ (C. P. GRADE)]

| Run No. | v./v./hr. | Temp. °F. | Per Cent Alc. Conv. to MEK | Per Cent Yield | | | |
|---|---|---|---|---|---|---|---|
| | | | | EA"K | Olefin | MEK | |
| 43 | 1.5 | 750 | 88.2 | 4.18 | 3.5 | 91.0 | |
| 44 | 6.0 | 750 | 48.8 | .69 | .63 | 97.0 | |
| 45 | 3.0 | 900 | 93.8 | 1.83 | 2.0 | 96.0 | |
| 46 | 1.5 | 750 | 38.0 | 2.3 | 1.8 | 90.2 | |

[DEHYDROGENATION OF 99% SEC. BuOH OVER 94 WEIGHT PER CENT ZnO:6 WEIGHT PER CENT Ce₂O₃]

| Run No. | v./v./hr. | Temp. °F. | | | | |
|---|---|---|---|---|---|---|
| 58A | 1.5 | 750 | 94.6 | 0.24 | 0.1 | 99.6 |
| 58B | 6.0 | 750 | 83.7 | .98 | .4 | 98.8 |
| 58C | 3.0 | 900 | 90.6 | 1.3 | .6 | 98.2 |
| 58D | 1.5 | 750 | 60.15 | 1.61 | 1.8 | 96.7 |
| 61A | 1.5 | 750 | 88.1 | 8.0 | 1.91 | 90.1 |
| 61B | 6.0 | 750 | 71.0 | 1.61 | .84 | 97.7 |
| 61C | 3.0 | 900 | 91.5 | 1.42 | 2.34 | 96.0 |
| 61D | 1.5 | 750 | 62.2 | 1.7 | 3.5 | 94.8 |

[DEHYDROGENATION OF 99% SEC. BuOH OVER 94 WEIGHT PERCENT MgO:6 WEIGHT PERCENT ZrO₂ (C. P. GRADE)]

| Run No. | v./v./hr. | Temp., °F. | Conversion | | Mol percent Yield |
|---|---|---|---|---|---|
| | | | Mols to— | Mol percent to— | |
| 114 | 1.5<br>9.49 mols<br>sec.-BuOH fed | 750 | MEK, 6.166<br>EA"K, .084<br>C₄ Olefin, .144 | 64.2<br>.87<br>1.5 | 96.6<br>1.3<br>2.25 |

[DEHYDROGENATION OF 99% ISOPROPANOL OVER 94 WEIGHT PERCENT MgO:6 WEIGHT PERCENT ZrO₂ (C. P. GRADE)]

| Run No. | v./v./hr. | Temp. °F. | Conversion | | Mol percent Yield |
|---|---|---|---|---|---|
| | | | Mols IPOH Conv. | Mol. percent | |
| 115 | 1.5<br>11.7 mols<br>IPOH fed | 750 | Acetone, 6.042<br>Mesityl Oxide, .059<br>C₃" Olefin, .578<br>Polymer, .023 | 51.0<br>.49<br>4.8<br>.19 | 91.6<br>0.88<br>8.62<br>0.34 |

THERMAL STABILITY AND CATALYST LIFE

In order to test the thermal stability of the catalyst, tests were run for a period of five hours each at a temperature of 750° F., at a feed rate of 1.5, then at a temperature of 750° F., and a feed rate of 6.0, then at a temperature of 900° F., at a feed rate of 3.0, followed by a return to a temperature of 750° F., at a feed rate of 1.5. The runs in Table II demonstrate the thermal stability of the catalyst. It is estimated from the life studies that the catalyst employed would last for three to six months without regeneration. The runs also demonstrate the stability of the catalyst over a wide range of temperature.

Table II

| | A | B | C | D |
|---|---|---|---|---|
| Run No. 79 | | | | |
| Catalyst: 94 weight per cent ZnO:6 weight per cent ZrO₂ (Tamopax) Feed: 99% Isopropanol: | | | | |
| Catalyst on stream, hrs | 0-5 | 5-10 | 10-15 | 15-20 |
| Feed Rate, v./v./hr | 1.5 | 6.0 | 3.0 | 1.5 |
| Temperature, °F | 750 | 750 | 900 | 750 |
| Mol Per Cent Alcohol to: | | | | |
| Acetone | 87.0 | 55.8 | 82.4 | 51.7 |
| IPOH | 5.43 | 40.6 | 8.18 | 41.4 |
| C₃= | 2.15 | .67 | 7.56 | 5.23 |
| Mesityl Oxide | 5.43 | 2.91 | 1.81 | 1.59 |
| Per Cent Yield Acetone | 92.0 | 94.0 | 89.8 | 88.2 |
| Run No. 80 | | | | |
| Catalyst: 94 weight per cent ZnO:6 weight per cent ZrO₂ (Zirconia was a spectroscopic reference sample, more pure than C. P. grade) Feed: 99% sec-Butanol: | | | | |
| Catalyst on stream, hrs | 0-5 | 5-10 | 10-15 | 15-20 |
| Feed Rate, v./v./hr | 1.5 | 6.0 | 3.0 | 1.5 |
| Temperature, °F | 750 | 750 | 900 | 750 |
| Mol Per Cent Alcohol to: | | | | |
| MEK | 84.5 | 62.3 | 91.0 | 49.2 |
| sec-BuOH | .2 | 33.6 | 1.48 | 46.2 |
| Bu= | 1.52 | .68 | 5.52 | 3.8 |
| EA=K | 13.85 | 3.4 | 1.87 | .7 |
| Per Cent MEK Yield | 84.6 | 93.8 | 92.4 | 91.5 |
| Run No. 83 | | | | |
| Catalyst: 94 weight per cent ZnO:6 weight per cent ZrO₂ (Tamopax) Feed: 91% Isopropanol: | | | | |
| Catalyst on stream, hrs | 0-5 | 5-10 | 10-15 | 15-20 |
| Feed Rate, v./v./hr | 1.5 | 6.0 | 3.0 | 1.5 |
| Temperature, °F | 750 | 750 | 900 | 750 |
| Weight Per Cent Composition of Crude Product: | | | | |
| Acetone | 75.58 | 44.82 | 86.2 | 74.14 |
| IPOH | 3.37 | 41.56 | .428 | 9.40 |
| H₂O | 16.11 | 14.63 | 12.95 | 13.96 |
| Per Cent Conversion | 95.7 | 51.9 | 99.0 | 88.8 |
| Run No. 70 | | | | |
| Catalyst: 88 weight per cent ZnO:12 weight per cent ZrO₂ C. P. grade Feed: 91% Isopropanol: | | | | |
| Catalyst on stream, hrs | 0-5 | 5-10 | 10-15 | 15-20 |
| Feed Rate, v./v./hr | 1.5 | 6.0 | 3.0 | 1.5 |
| Temperature, °F | 750 | 750 | 900 | 750 |
| Mol per cent Alcohol to: | | | | |
| Acetone | 81.3 | 70.1 | 89.8 | 86.2 |
| IPOH | 5.5 | 22.6 | 1.05 | 8.72 |
| C₃= | 1.4 | .57 | 1.24 | .97 |
| Mesityl Oxide | 11.75 | 6.66 | 8.42 | 4.04 |
| Per Cent Acetone Yield | 86.0 | 90.6 | 90.7 | 93.4 |
| Run No. 71 | | | | |
| Catalyst: 88 weight per cent ZnO:12 weight per cent ZrO₂ C. P. grade Feed: 99% sec-Butanol: | | | | |
| Catalyst on stream, hrs | 0-5 | 5-10 | 10-15 | 15-20 |
| Feed rate, v./v./hr | 1.5 | 6.0 | 3.0 | 1.5 |
| Temperature, °F | 750 | 750 | 900 | 750 |
| Mol per cent Alcohol to: | | | | |
| MEK | 90.6 | 57.2 | 95.2 | 89.0 |
| sec-BuOH | 4.68 | 41.6 | .75 | 6.5 |
| Bu= | 1.93 | .64 | 2.0 | 2.1 |
| EA=K | 1.9 | .43 | 2.0 | 2.5 |
| Per cent MEK Yield | 95.1 | 97.9 | 95.9 | 95.2 |
| Run No. 74 | | | | |
| Catalyst: 94 weight per cent ZnO: 6 ZrO₂ (Tamopax) Feed: 99% sec-Butanol: | | | | |
| Catalyst on stream, hrs | 0-5 | 5-10 | 10-15 | 15-20 |
| Feed rate, v./v./hr | 1.5 | 6.0 | 3.0 | 1.5 |
| Temperature, °F | 750 | 750 | 900 | 750 |
| Mol per cent Alcohol To: | | | | |
| MEK | 86.8 | 83.5 | 85.9 | 69.6 |
| sec-BuOH | 1.5 | 14.0 | 9.25 | 21.2 |
| Bu= | 1.8 | 1.1 | 4.0 | 5.0 |
| EA=K | 6.9 | 1.3 | .79 | 4.1 |
| Per cent MEK Yield | 88.2 | 97.1 | 94.6 | 88.4 |

For a given alcohol quantity the catalysts containing zirconium oxide, cerium oxide, and thorium oxide, exhibit marked resistance to poisons. For example, the secondary butyl alcohol employed in the runs described contained 91 to 99 weight per cent alcohol, 1 to 7.3 weight per cent impurities, and 0.3 to 1% water.

Having described the invention in a manner such that it may be understood by those skilled in the art, and having demonstrated the same by suitable examples, what is claimed is:

1. A process for converting saturated aliphatic alcohols to saturated carbonyl compounds which comprises passing a saturated aliphatic alcohol over a dehydrogenation catalyst consisting essentially of a mixture of component A selected from the group consisting of zinc oxide, magnesium oxide and beryllium oxide, 1 to 15% of component B selected from the group consisting of zirconium oxide, cerium oxide and thorium oxide based on the total weight of the mixture, and 6 to 10% of at least one component C selected from the group consisting of silicon oxide, iron oxide, and aluminum oxide based on the weight of component B.

2. A process according to claim 1 in which the catalyst is deposited on steel turnings.

3. A process according to claim 1 in which isopropanol is converted to acetone.

4. A process according to claim 1 in which secondary butanol is converted to methyl ethyl ketone.

5. A process for converting saturated aliphatic alcohols to ketones containing the same number of carbon atoms which comprises passing a saturated aliphatic alcohol over a dehydrogenation catalyst consisting essentially of a mixture of zinc oxide, 6 to 12% zirconium oxide based on the total weight of the mixture, and 6 to 10% of silica based on the weight of zirconium oxide.

6. A process according to claim 5 in which isopropanol is converted to acetone.

7. A process according to claim 5 in which secondary butanol is converted to methyl ethyl ketone.

8. A process for converting saturated aliphatic alcohols to ketones containing the same number of carbon atoms which comprises passing a saturated aliphatic alcohol over a dehydrogenation catalyst consisting essentially of a mixture of zinc oxide, 6 to 12% thorium oxide based on the total weight of the mixture, and 6 to 10% of silica based on the weight of the thorium oxide.

HENRY O. MOTTERN.

REFERENCES CITED

The following references are of record in the file of this patent:

UNITED STATES PATENTS

| Number | Name | Date |
|---|---|---|
| 2,179,488 | Beamer | Nov. 14, 1939 |
| 2,418,888 | Kearby | Apr. 15, 1947 |
| 2,436,970 | Mistretta | Mar. 2, 1948 |
| 2,549,844 | Mottern | Apr. 24, 1951 |

FOREIGN PATENTS

| Number | Country | Date |
|---|---|---|
| 337,566 | Great Britain | Nov. 6, 1930 |